US012574299B2

(12) United States Patent
Wang et al.

(10) Patent No.: US 12,574,299 B2
(45) Date of Patent: Mar. 10, 2026

(54) NETWORK MANAGEMENT AND CONTROL METHOD AND SYSTEM THEREOF, AND STORAGE MEDIUM

(71) Applicant: ZTE CORPORATION, Shenzhen (CN)

(72) Inventors: Dajiang Wang, Shenzhen (CN); Qilei Wang, Shenzhen (CN); Jin Zhou, Shenzhen (CN); Kui Jia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 23 days.

(21) Appl. No.: 18/684,040

(22) PCT Filed: Jul. 29, 2022

(86) PCT No.: PCT/CN2022/109218
§ 371 (c)(1),
(2) Date: Feb. 15, 2024

(87) PCT Pub. No.: WO2023/045565
PCT Pub. Date: Mar. 30, 2023

(65) Prior Publication Data
US 2024/0396810 A1 Nov. 28, 2024

(30) Foreign Application Priority Data
Sep. 22, 2021 (CN) .......................... 202111108462.1

(51) Int. Cl.
*H04L 41/16* (2022.01)
*H04L 41/0816* (2022.01)
(Continued)

(52) U.S. Cl.
CPC .......... *H04L 41/16* (2013.01); *H04L 41/0816* (2013.01); *H04L 41/145* (2013.01); *H04L 41/147* (2013.01)

(58) Field of Classification Search
CPC ....... H04L 41/145; H04L 51/046; H04L 9/50; H04L 63/1425; H04L 41/0894;
(Continued)

(56) References Cited

U.S. PATENT DOCUMENTS

2019/0149425 A1 5/2019 Larish et al.
2020/0067788 A1* 2/2020 Thakkar .................. H04L 41/12
(Continued)

FOREIGN PATENT DOCUMENTS

CN 103151049 A 3/2016
CN 109787928 A 5/2019
(Continued)

OTHER PUBLICATIONS

Cui, S., et al. "Dynamic Programmable Optical Transceiver Configuration Based on Digital Twin," IEEE Communications Letters, vol. 25, No. 1, Jan. 2021, pp. 205-208.
(Continued)

*Primary Examiner* — Djenane M Bayard
(74) *Attorney, Agent, or Firm* — Vivacqua Crane, PLLC

(57) ABSTRACT

A network management and control method and system, and a storage medium are disclosed. The method may include: obtaining a parameter change value of a target object, wherein the parameter change value is from a Digital Twin (DT) virtual model, the DT virtual model is constructed based on a physical model, the physical model comprises entity objects of a physical network, and the parameter change value represents a change in transmission performance of the target object; inputting the parameter change value into a pre-trained perception model, to obtain a state
(Continued)

prediction result output by the perception model; inputting the state prediction result into a pre-trained cognitive model, to obtain configuration adjustment information output by the cognitive model; and in response to the configuration adjustment information passing emulation verification, adjusting the physical model according to the configuration adjustment information.

16 Claims, 8 Drawing Sheets

(51) Int. Cl.
    *H04L 41/14*       (2022.01)
    *H04L 41/147*     (2022.01)

(58) Field of Classification Search
    CPC . H04L 63/1416; H04L 41/0895; H04L 41/12; H04L 41/14; H04L 41/16; H04L 43/08; H04L 67/1097; H04L 67/125; H04L 41/0816; H04L 41/0823; H04L 41/0866; H04L 41/147; H04L 43/20; H04L 43/50; H04L 67/10; H04L 67/12; H04L 12/10; H04L 2209/56; H04L 41/0677; H04L 41/0876; H04L 41/0893; H04L 63/1433; H04L 63/20; H04L 67/1095; H04L 9/001; H04L 9/3239; H04L 1/0002; H04L 1/0009; H04L 1/0041; H04L 1/0076; H04L 1/16; H04L 1/18; H04L 1/1854; H04L 1/1867; H04L 1/1874; H04L 67/34; H04L 9/0643; H04L 47/83; H04L 12/14; H04L 47/783; H04L 47/788; H04L 67/52; H04L 5/0064; H04L 63/1441; H04L 67/60; H04L 67/02; H04L 67/133; H04L 43/0852; H04L 63/00; H04L 9/3263; H04L 63/10; H04L 63/123; H04L 25/0204; H04L 25/022; H04L 25/0224; H04L 25/0242; H04L 27/2607; H04L 27/2614; H04L 27/2618; H04L 27/2621; H04L 27/2624; H04L 27/2626; H04L 27/2649; H04L 27/2655; H04L 27/2657; H04L 27/367; H04L 45/24; H04L 5/0007; G06F 30/20; G06F 30/23; G06F 2111/10; G06F 2111/20; G06F 30/00; G06F 30/27; G06F 2119/02; G06F 2119/08; G06F 30/13; G06F 2113/08; G06F 2119/14; G06F 30/15; G06F 30/367; G06F 30/392; G06F 1/28; G06F 1/3228; G06F 17/16; G06F 3/04847; G06F 30/17; G06F 30/28; G06F 30/33; G06F 30/3308; G06F 30/398; G06F 13/4027; G06F 17/18; G06F 18/24; G06F 21/54; G06F 21/554; G06F 21/563; G06F 21/568; G06F 21/577; G06F 2111/04; G06F 2113/04; G06F 3/04842; G06F 30/30
    See application file for complete search history.

(56)           References Cited

U.S. PATENT DOCUMENTS

| | | | |
|---|---|---|---|
| 2020/0349041 A1* | 11/2020 | Roll | G06F 30/20 |
| 2020/0394226 A1 | 12/2020 | Xing et al. | |
| 2021/0075686 A1* | 3/2021 | Smith | G06N 5/022 |
| 2023/0026782 A1* | 1/2023 | Sha | H04L 67/1001 |

FOREIGN PATENT DOCUMENTS

| | | |
|---|---|---|
| CN | 111208759 A | 5/2020 |
| CN | 111835565 A | 10/2020 |
| CN | 112187547 A | 1/2021 |
| CN | 113111473 A | 7/2021 |
| TW | I700907 B | 8/2020 |

OTHER PUBLICATIONS

European Patent Office. Extended European Search Report for EP Application No. 22871623.9, mailed Nov. 6, 2024, pp. 1-12.
Wang, D., et al. "The Role of Digital Twin in Optical Communication: Fault Management, Hardware Configuration, and Transmission Simulation," IEEE Communications Magazine, Jan. 2021, pp. 133-139.
International Searching Authority. International Search Report and Written Opinion for PCT Application No. PCT/CN2022/109218 and English translation, mailed Oct. 28, 2022, pp. 1-11.

* cited by examiner

Obtain an environment data set corresponding to a physical model from a DT virtual model, where the environment data set includes a performance parameter and a state parameter of each entity object in the physical model ⟋ S510

FIG. 5

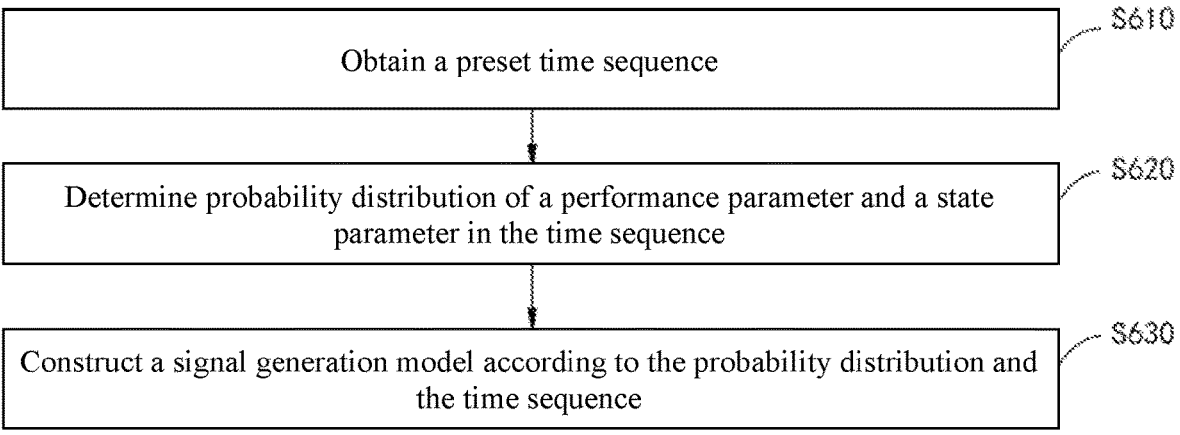

Obtain a preset time sequence ⟋ S610

Determine probability distribution of a performance parameter and a state parameter in the time sequence ⟋ S620

Construct a signal generation model according to the probability distribution and the time sequence ⟋ S630

FIG. 6

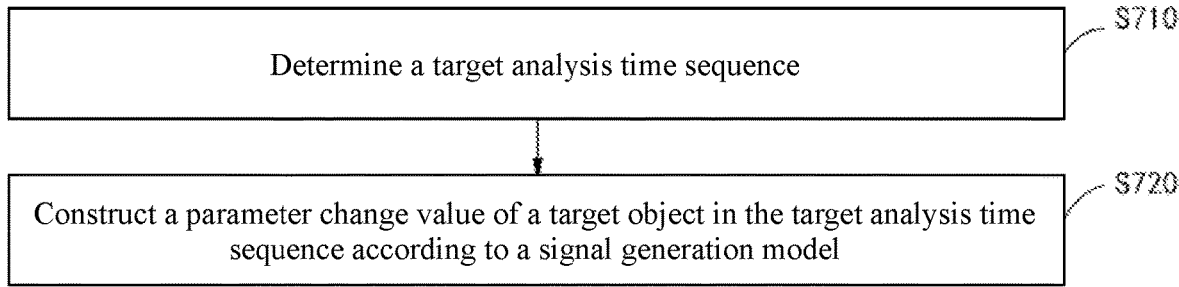

Determine a target analysis time sequence ⟋ S710

Construct a parameter change value of a target object in the target analysis time sequence according to a signal generation model ⟋ S720

FIG. 7

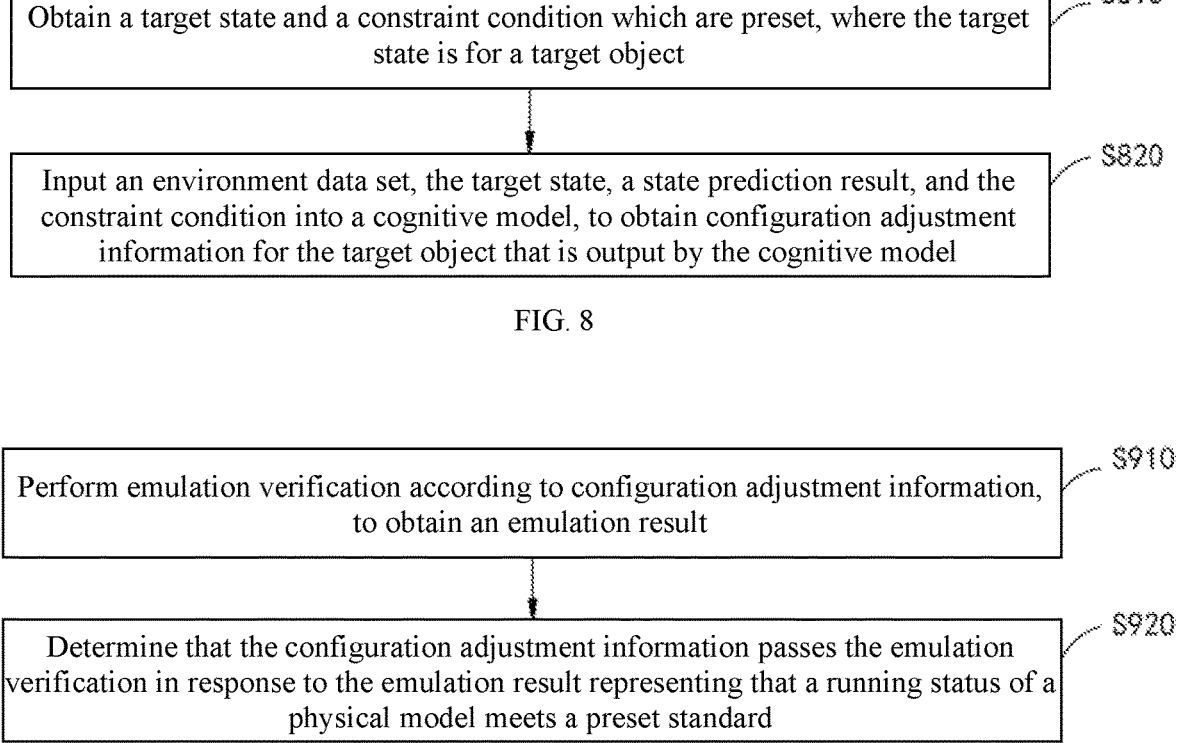

Obtain a target state and a constraint condition which are preset, where the target state is for a target object
~ S810

Input an environment data set, the target state, a state prediction result, and the constraint condition into a cognitive model, to obtain configuration adjustment information for the target object that is output by the cognitive model
~ S820

FIG. 8

Perform emulation verification according to configuration adjustment information, to obtain an emulation result
~ S910

Determine that the configuration adjustment information passes the emulation verification in response to the emulation result representing that a running status of a physical model meets a preset standard
~ S920

FIG. 9

Perform training from a cognitive model to a perception model using a backward propagation algorithm, where a performance parameter is a training input of the perception model, a state parameter is a training output of the perception model, a state prediction result and an environment data set are training inputs of the cognitive model, and a target state is determined as an output of the cognitive model

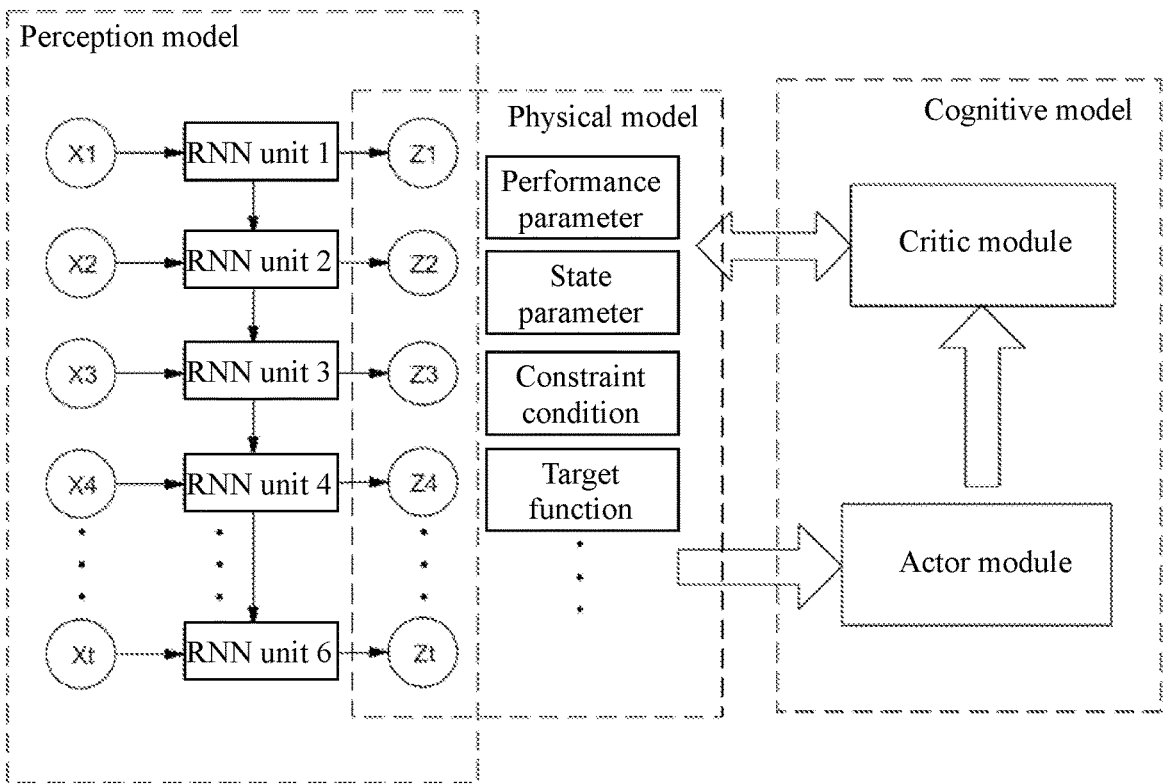

FIG. 12

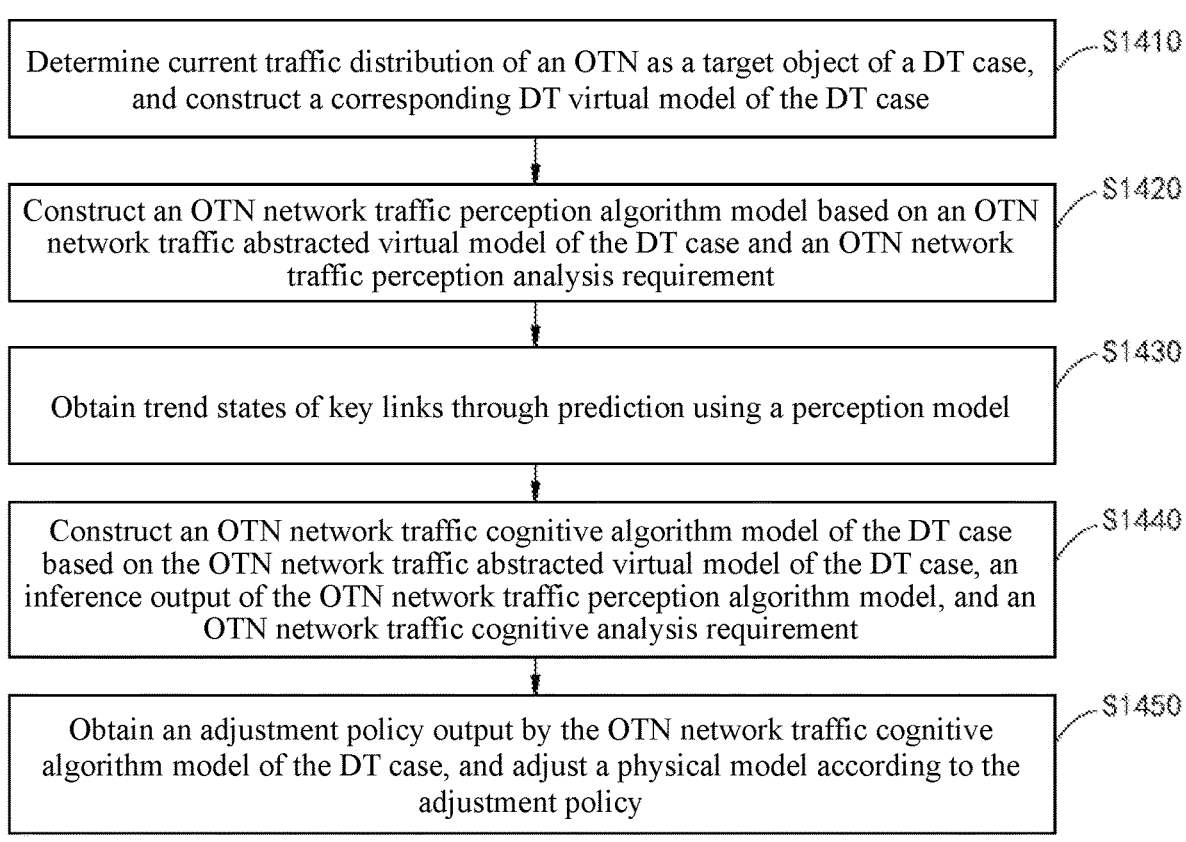

Determine current traffic distribution of an OTN as a target object of a DT case, and construct a corresponding DT virtual model of the DT case ⟋~S1410

Construct an OTN network traffic perception algorithm model based on an OTN network traffic abstracted virtual model of the DT case and an OTN network traffic perception analysis requirement ⟋~S1420

Obtain trend states of key links through prediction using a perception model ⟋~S1430

Construct an OTN network traffic cognitive algorithm model of the DT case based on the OTN network traffic abstracted virtual model of the DT case, an inference output of the OTN network traffic perception algorithm model, and an OTN network traffic cognitive analysis requirement ⟋~S1440

Obtain an adjustment policy output by the OTN network traffic cognitive algorithm model of the DT case, and adjust a physical model according to the adjustment policy ⟋~S1450

FIG. 14

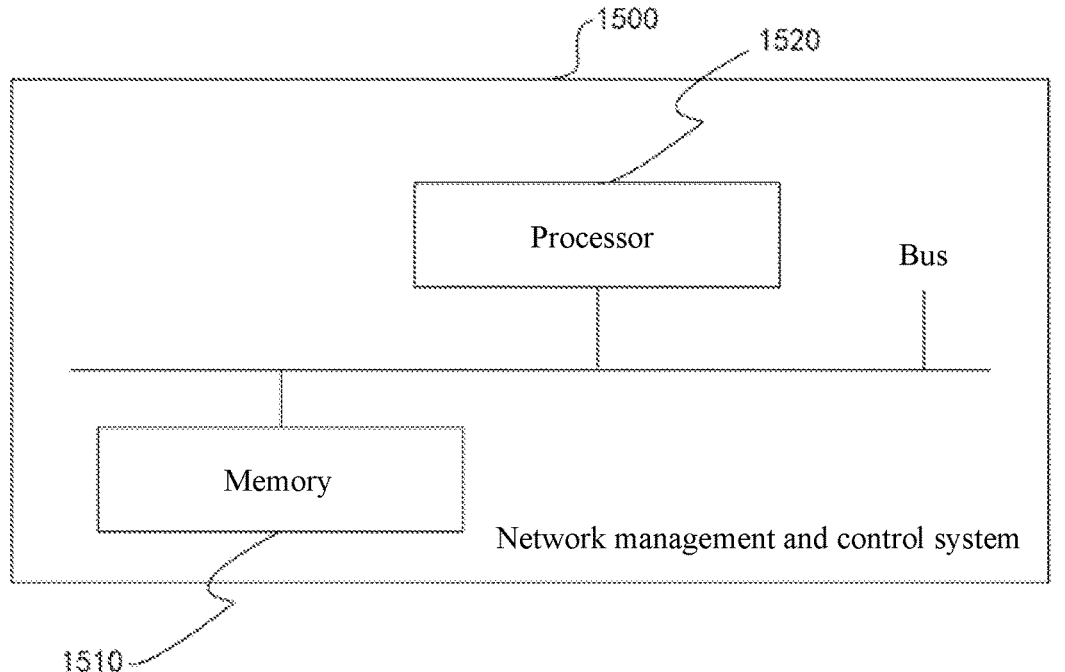

FIG. 15

NETWORK MANAGEMENT AND CONTROL METHOD AND SYSTEM THEREOF, AND STORAGE MEDIUM

CROSS-REFERENCE TO RELATED APPLICATION

This application is a national stage filing under 35 U.S.C. § 371 of international application number PCT/CN2022/109218, filed Jul. 29, 2022, which claims priority to Chinese patent application No. 202111108462.1, filed Sep. 22, 2021. The contents of these applications are incorporated herein by reference in their entirety.

TECHNICAL FIELD

The present disclosure relates to, but not limited to, the field of optical communication networks, and more particularly, to a network management and control method and system, and a storage medium.

BACKGROUND

Cognitive optical network technology represents a new generation of intelligent optical network management and control, leveraging machine learning. This technology can automatically perceive, understand, and learn a network environment, adjust network configuration in real time, and intelligently adapt to a change in the network environment. Further, this technology can implement fast fault detection and locating, real-time optical path performance monitoring and quality prediction, automatic optimization of transmission parameters, traffic prediction, route planning, fault rooting, reduction of optical layer recovery time, and the like. Thus, it enhances the overall quality of all-optical networks and lays the technical foundation for new intelligent optical network management and control technologies, such as Autonomous Driving Optical Network (ADON), Intent-Based Optical Network (IBON), and cloud-optical convergence.

Cognitive analysis and emulation of an optical network need to be performed without affecting a physical network environment and running of the optical network. Generally, a high-fidelity digital virtual model of a physical object is created by using a Digital Twin (DT) technology, to simulate behavior of the physical object. However, the virtual model generated by DT currently serves only as a data basis, as there is no existing technology that facilitates collaboration between DT and cognitive optical network technology.

SUMMARY

The following is an overview of the topic detailed in the present disclosure. This overview is not intended to limit the protection scope of the claims.

Embodiments of the present disclosure provide a network management and control method and system, and a storage medium.

In accordance with a first aspect of the present disclosure, an embodiment provides a network management and control method, including: obtaining a parameter change value of a target object, where the parameter change value is from a DT virtual model, the DT virtual model is constructed based on a physical model, the physical model includes entity objects of a physical network, and the parameter change value represents a change in transmission performance of the target object; inputting the parameter change value into a pre-trained perception model, to obtain a state prediction result output by the perception model; inputting the state prediction result into a pre-trained cognitive model, to obtain configuration adjustment information output by the cognitive model; and in response to the configuration adjustment information passing emulation verification, adjusting the physical model according to the configuration adjustment information.

In accordance with a second aspect of the present disclosure, an embodiment provides a network management and control system, including a memory, a processor, and a computer program stored in the memory and executable by the processor which, when executed by the processor, causes the processor to implement the network management and control method according to the first aspect.

Other features and advantages of the present application will be illustrated in the following description, and will partially become apparent from the description or be appreciated by practicing the present application.

BRIEF DESCRIPTION OF DRAWINGS

The accompanying drawings are intended to provide a further understanding of the technical schemes in the present disclosure and constitute a part of the description. The accompanying drawings and the embodiments of the present disclosure are intended to illustrate the technical schemes of the present disclosure, and do not constitute a limitation to the technical schemes of the present disclosure.

FIG. 5 is a flowchart of obtaining an environment data set according to another embodiment of the present disclosure;

FIG. 6 is a flowchart of constructing a signal generation model according to another embodiment of the present disclosure;

FIG. 7 is a flowchart of generating a parameter change value according to another embodiment of the present disclosure;

FIG. 8 is a flowchart of obtaining configuration adjustment information according to another embodiment of the present disclosure;

FIG. 9 is a flowchart of applying configuration adjustment information according to another embodiment of the present disclosure;

FIG. 11 is a flowchart of training a cognitive model and a perception model according to another embodiment of the present disclosure;

FIG. 12 is an example diagram of a cognitive model according to another embodiment of the present disclosure;

FIG. 14 is a flowchart of Example one according to another embodiment of the present disclosure; and FIG. 15 is a structural diagram of a network management and control system according to another embodiment of the present disclosure.

DETAILED DESCRIPTION

To make the technical schemes, and advantages of the present disclosure clear, the following further describes the present disclosure in detail in conjunction with the accompanying drawings and embodiments. It should be understood that the specific embodiments described herein are merely used to illustrate the present disclosure, but are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a network management and control method and system, and a storage medium. The method includes: obtaining a parameter change value of a target object, where the parameter change value is from a DT virtual model, the DT virtual model is constructed based on a physical model, the physical model includes entity objects of a physical network, and the parameter change value represents a change in transmission performance of the target object; inputting the parameter change value into a pre-trained perception model, to obtain a state prediction result output by the perception model; inputting the state prediction result into a pre-trained cognitive model, to obtain configuration adjustment information output by the cognitive model; and when the configuration adjustment information passes emulation verification, adjusting the physical model according to the configuration adjustment information. According to the schemes provided in the embodiments of the present disclosure, a DT virtual model can be used as a data basis, a change of a physical model and a change trend can be perceived and predicted by using a perception model, and a perception result and a prediction result can be used as inputs of a cognitive model, to obtain configuration adjustment information of a physical network. After emulation verification is performed, automatic management and control of the physical network can be implemented.

The network management and control method of the present disclosure is further described below.

Figure 1:
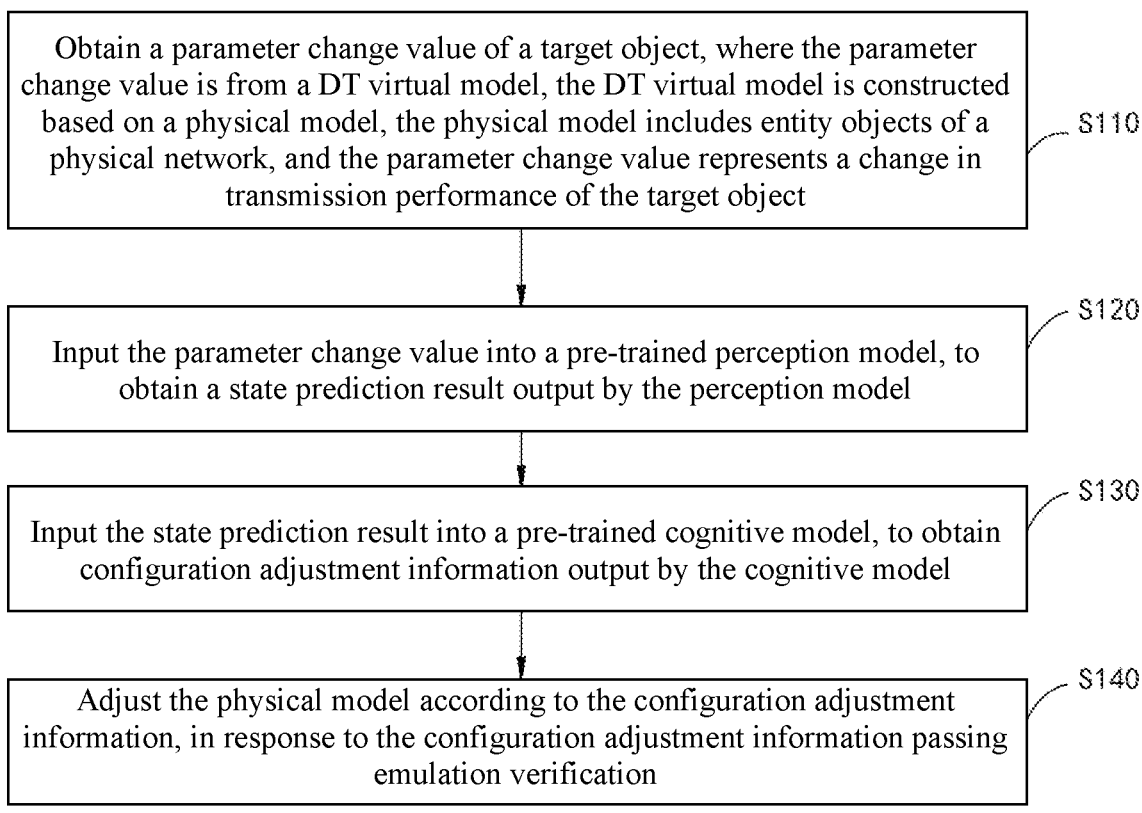
FIG. 1 is a flowchart of a network management and control method according to an embodiment of the present disclosure.

FIG. 1 is a flowchart of a network management and control method according to an embodiment of the present disclosure. As shown in FIG. 1, the method includes, but not limited, to the following steps S110, S120, S130, and S140.

At S110, a parameter change value of a target object is obtained, where the parameter change value is from a DT virtual model, the DT virtual model is constructed based on a physical model, the physical model includes entity objects of a physical network, and the parameter change value represents a change in transmission performance of the target object.

It should be noted that the physical model may include any entity object, for example, an Optical Transport Network (OTN) topology environment includes a plurality of routing nodes and a plurality of transmission links. Specific composition of the physical model is not limited in this embodiment. The target object may be any entity object in the physical model, and may be selected according to an analysis requirement.

It should be noted that a parameter corresponding to the parameter change value may be any performance parameter of the target object. A type of the parameter is not particularly limited in this embodiment, as long as the parameter can represent transmission performance of the target object. The parameter change value may be a change amplitude of a value of a performance parameter, for example, an increase or decrease in bandwidth, an increase or decrease in a quantity of ports, or a change of a status, as long as the parameter change value can reflect a change in a performance parameter of an entity object.

Figure 2:
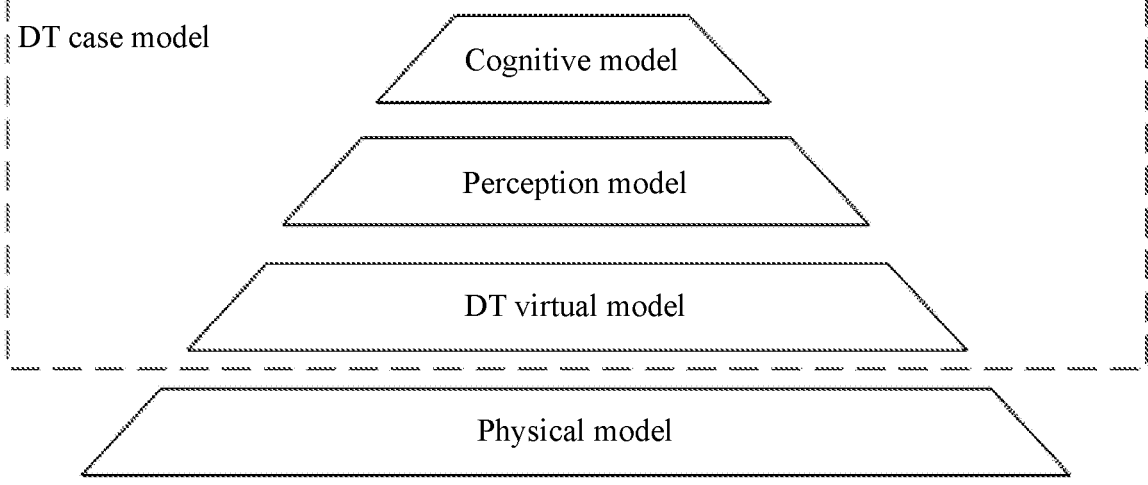
FIG. 2 is a structural diagram of a DT case model and a physical model according to another embodiment of the present disclosure.

It should be noted that a DT case generally includes a basic model and a functional model. In this embodiment, for a hierarchical structure of the DT case, reference may be made to FIG. 2. The basic model is a DT virtual model, and the functional model includes a perception model and a cognitive model. The DT virtual model is obtained by performing abstracted virtual processing on a physical model. The DT virtual model is used as the basic model, and functions as a model basis and a mathematical background for subsequent perception analysis and cognitive analysis. The abstracted virtual model is a basis for construction, training and reasoning of a perception algorithm model and a cognitive algorithm model.

At S120, the parameter change value is input into a pre-trained perception model, to obtain a state prediction result output by the perception model.

It should be noted that the perception model is the functional model of the DT case. Based on an application scenario of the DT case, virtual model information of the target object is relied on and extracted, data of the target object in the physical model, such as traffic, a performance parameter, an object status, etc., is sampled as the input and the output, and the corresponding perception model is generated through training. The perception model may be implemented by using any Artificial Intelligence (AI) technology that can implement prediction, for example, Convolutional Neural Network (CNN), Deep Neural Network (DNN), or Deep Reinforcement Learning (DRL). An algorithm used for the perception model is not limited in this embodiment.

It should be noted that, with the perception model, impact of a change in a network environment in which the target object of the DT case is located on a current network status and a network service that involve the target object can be inferred and predicted, to obtain the state prediction result. For example, a link is in a lightly-loaded state. Different state prediction results are adjusted for different object types.

It may be understood that the DT virtual model describes a parameter of an environment in which the physical model is located, and can actively predict and perceive, by using the perception model, a change in the environment caused by a change of the parameter. Therefore, a trigger signal and a model input are provided for further network cognition, and automatic detection of an OTN is implemented.

At S130, the state prediction result is input into a pre-trained cognitive model, to obtain configuration adjustment information output by the cognitive model.

It should be noted that the cognitive model is the functional model of the DT case. Based on the application scenario of the DT case, the virtual model information of the target object is relied on and extracted, the corresponding cognitive model is generated by using the state prediction result obtained by the perception model through analysis as an input and in combination with training with an AI technology. In addition, the configuration adjustment information of the target object of the DT case can be inferred using the algorithm model. Any algorithm related to a cognitive technology may be used for the cognitive model as long as the algorithm can implement the cognitive technology, for example, an Actor-Critic algorithm. In this embodiment, the algorithm and an implementation manner thereof are not described. Those having ordinary skills in the art have a motive to select a proper algorithm according to a timing requirement to configure the cognitive model.

Figure 3:
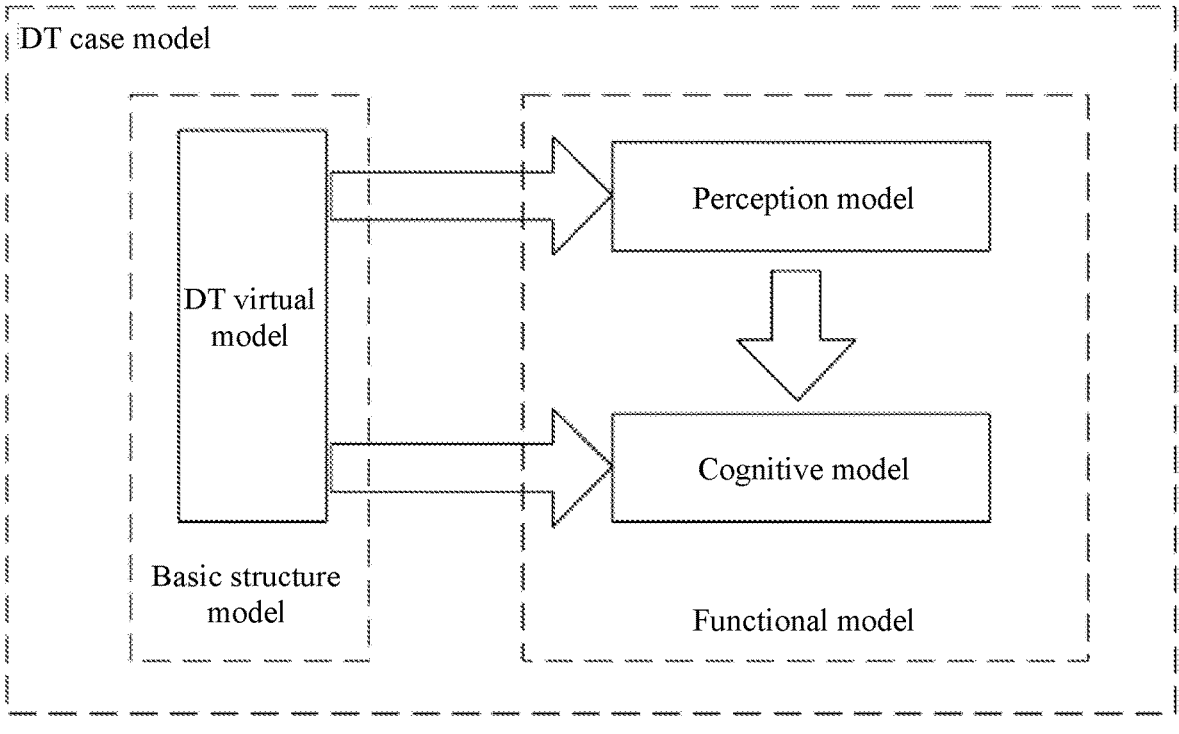
FIG. 3 is a structural diagram of a DT case model according to another embodiment of the present disclosure.

It should be noted that, for a relationship between the cognitive model, the perception model, and the DT virtual model, reference may be made to FIG. 3. As a basic structure model, the DT virtual model provides environment data of the physical model for the cognitive model and the perception model. A state prediction result output by the perception model is used as an input of the cognitive model, to realize concatenation between the perception model and the cognitive model. Therefore, automatic and intelligent management and control of a network in terms of acquisition of data, active perception of changes and determining of configuration adjustment information is achieved in a form of closed loop.

It should be noted that, during perception analysis and cognitive analysis, three models in a same DT case may be separately split and a plurality of sub-instances may be created for each model according to an object structure and a function analysis requirement. Details are not described herein.

At S140, when the configuration adjustment information passes emulation verification, the physical model is adjusted according to the configuration adjustment information.

It should be noted that the configuration adjustment information obtained by using the cognitive technology may be any available configuration information, for example, adjustment of a performance parameter, or may be a configuration change policy, for example, adjustment of a transmission path, as long as the configuration information can cause a change in a physical environment in which the physical model is located.

It should be noted that, to ensure that the configuration adjustment information does not have an unnecessary derivative effect on the physical model, the emulation verification may be performed before the configuration adjustment information is applied. In this embodiment, no limitation is made on a specific process of emulation verification. When the configuration adjustment information is available, those having ordinary skills in the art know how to perform emulation verification, and details are not described herein.

It should be noted that an overall procedure of this embodiment is a cyclic iterative process, and may span an entire autonomous life cycle of a network. By monitoring and perceiving in real time a change in the network environment related to the target object, a related state change of the target object is inferred and predicted, and configuration adjustment information for the target object is obtained after cognitive determining and analysis using an AI technology and an emulation technology, such that the configuration adjustment information is implemented in a physical network environment. In addition, a cognitive procedure includes emulation and configuration implementation of a network change. For the cognitive model, optimizing timeliness and accuracy of implementing a configuration change can be used as a quality evaluation standard for measuring modeling and algorithm performance of a network management and control system.

With the technical scheme in this embodiment, automatic and intelligent cognitive analysis can be implemented, a quantity of attempts in changing configuration of a physical network environment is effectively reduced, precision of changing configuration to solve problems is improved, and impact of parameter adjustment on normal operation of a network service is reduced.

Figure 4:
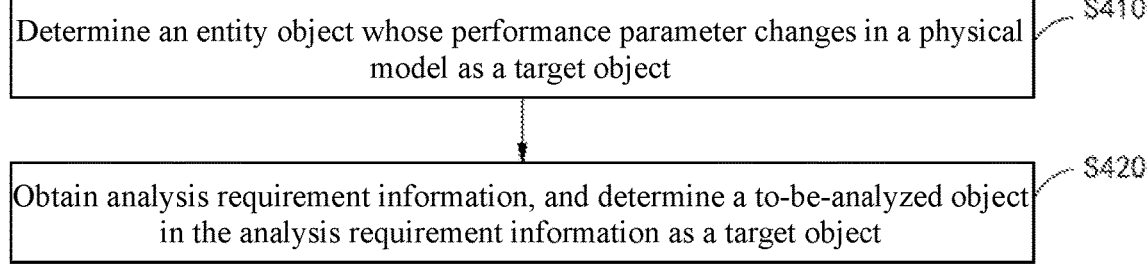
FIG. 4 is a flowchart of determining a target object according to another embodiment of the present disclosure.

In addition, in an embodiment, referring to FIG. 4, before S110 in the embodiment shown in FIG. 1 is performed, the method further includes, but not limited to, the following steps S410 to S420.

At S410, an entity object whose performance parameter changes in the physical model is determined as the target object.

Alternatively, At S420, analysis requirement information is obtained, and a to-be-analyzed object in the analysis requirement information is determined as the target object.

It should be noted that, for a physical network, a performance parameter of an entity object may be changing, or may remain unchanged. For example, a quantity of link ports is generally fixed, while traffic of a transmission link changes in real time. Therefore, an entity object whose performance parameter changes may be used as the target object, and a parameter change value of the entity object can be obtained using the DT virtual model for perception and cognition. Alternatively, the target object may be selected according to an analysis requirement. For example, for a survivability analysis requirement, impact of a change in a quantity of link ports or a fault on a transmission link in the physical network needs to be analyzed. Those having ordinary skills in the art have a motive to select a method for determining the target object according to an actual requirement, which is not limited herein.

In addition, in an embodiment, referring to FIG. 5, before S120 in the embodiment shown in FIG. 1 is performed, the method further includes, but not limited to, a following step S510.

At S510, an environment data set corresponding to the physical model is obtained from the DT virtual model, where the environment data set includes a performance parameter and a state parameter of each of the entity objects in the physical model.

It should be noted that after the DT case is constructed, a network environment of the physical model can be monitored in real time, and corresponding environment data is collected, so as to form an environment data set that includes a plurality of types of environment data. The environment data set may include the performance parameter and the state parameter of each of the entity objects. A specific collection manner is not described herein.

In addition, in an embodiment, referring to FIG. 6, after S510 in the embodiment shown in FIG. 5 is performed, the method further includes, but not limited to, the following steps S610 to S630.

At S610, a preset time sequence is obtained.

At S620, probability distribution of the performance parameter and the state parameter in the time sequence is determined.

At S630, a signal generation model is constructed according to the probability distribution and the time sequence.

It should be noted that, to avoid untimely or unexpectedly interrupted sampling of physical data, or a unsatisfied sampling condition, after the performance parameter and the state parameter are obtained, the probability distribution of the corresponding parameters in the specified time sequence may be obtained using a kernel smoothing method, and the signal generation model is constructed based on the probability distribution. Therefore, the signal generation model can use data which does not occur in a real environment and is generated according to the probability distribution as a sample parameter for perception and cognition, thereby achieving network analysis, management, and control.

It should be noted that the time sequence may be a time period of any length. Using link traffic as an example, link traffic on the first day of each month may be collected, and probability distribution of link traffic on a numerical basis is determined through kernel smoothing. A constructed signal generation model can determine link traffic on the first days of the next several months according to the probability distribution.

In addition, in an embodiment, referring to FIG. 7, S110 in the embodiment shown in FIG. 1 further includes, but not limited to, the following steps S710 to S720.

At S710, a target analysis time sequence is determined.

At S720, the parameter change value of the target object in the target analysis time sequence is constructed according to the signal generation model.

It should be noted that the target analysis time sequence may be a time period of any length, for example, the first days of the next three months. The target analysis time sequence may be determined according to an actual analysis requirement.

It should be noted that, because the signal generation model is determined according to the probability distribution of the performance parameter and the state parameter, after the target analysis time sequence is determined, the parameter change value of the target object in the target analysis time sequence can be generated using the signal generation model, and data is generated using a simulated environment, thereby improving emulation efficiency.

In addition, in an embodiment, referring to FIG. 8, S130 in the embodiment shown in FIG. 1 further includes, but not limited to, the following steps S810 to S820.

At S810, a target state and a constraint condition that are preset are obtained.

At S820, the environment data set, the target state, the state prediction result, and the constraint condition are input into the cognitive model, to obtain the configuration adjustment information for the target object that is output by the cognitive model.

It should be noted that the target state may be for the target object, or may be for the entire physical model. For example, for an OTN network, the target object may be a transmission link, and the target state may be set to "maximum load balancing degree as a final trajectory return", such that the configuration adjustment information that can achieve the foregoing target state is obtained using the cognitive model.

It should be noted that the constraint condition may be preset, or may be determined according to the state prediction result output by the perception model. For example, a link fault needs to be simulated. In this case, the constraint condition may be set as that the transmission link is unavailable, such that the cognitive model can perform cognitive prediction according to the constraint condition. For another example, in the obtained state prediction result, a path A is a congested path, and a path B is a lightly-loaded path. In this case, the path A may be taken as a must-avoid constraint, and the path B may be taken as a mandatory constraint. A specific manner of selecting the constraint condition may be determined according to an actual analysis requirement, and is not limited herein.

It should be noted that the cognitive model may use a DRL technology of Actor-Critic to input the environment data set, the target state, the state prediction result, and the constraint condition into the cognitive model. In addition, the cognitive model may use the DRL technology to perform global or local cognitive optimization, so as to obtain the configuration adjustment information that has undergone cognitive optimization, thereby implementing network optimization.

In addition, in an embodiment, referring to FIG. 9, S140 in the embodiment shown in FIG. 1 further includes, but not limited to, the following steps S910 to S920.

At S910, emulation verification is performed according to the configuration adjustment information, to obtain an emulation result.

At S920, when the emulation result represents that a running status of the physical model meets a preset standard, it is determined that the configuration adjustment information passes the emulation verification.

It should be noted that, the configuration adjustment information is obtained according to a current physical environment and a prediction result of the perception model. After the configuration adjustment information is applied to the physical model, a derivative effect may occur. For example, after traffic of a transmission link that is used as the target object is limited, traffic of another transmission link increases, resulting in link congestion. To ensure an optimization effect, after the configuration adjustment information is obtained, emulation may be first performed using an emulation tool. In this embodiment, the emulation tool and a specific emulation method are not limited. When the configuration adjustment information is available, those having ordinary skills in the art have a motive to select an appropriate emulation tool according to an actual requirement.

It should be noted that the preset standard may be determined according to a performance requirement on the physical network. For example, after adjustment, no congestion occurs on a transmission link, or the traffic meets a preset threshold. The preset standard may be adjusted according to an actual requirement.

Figure 10:
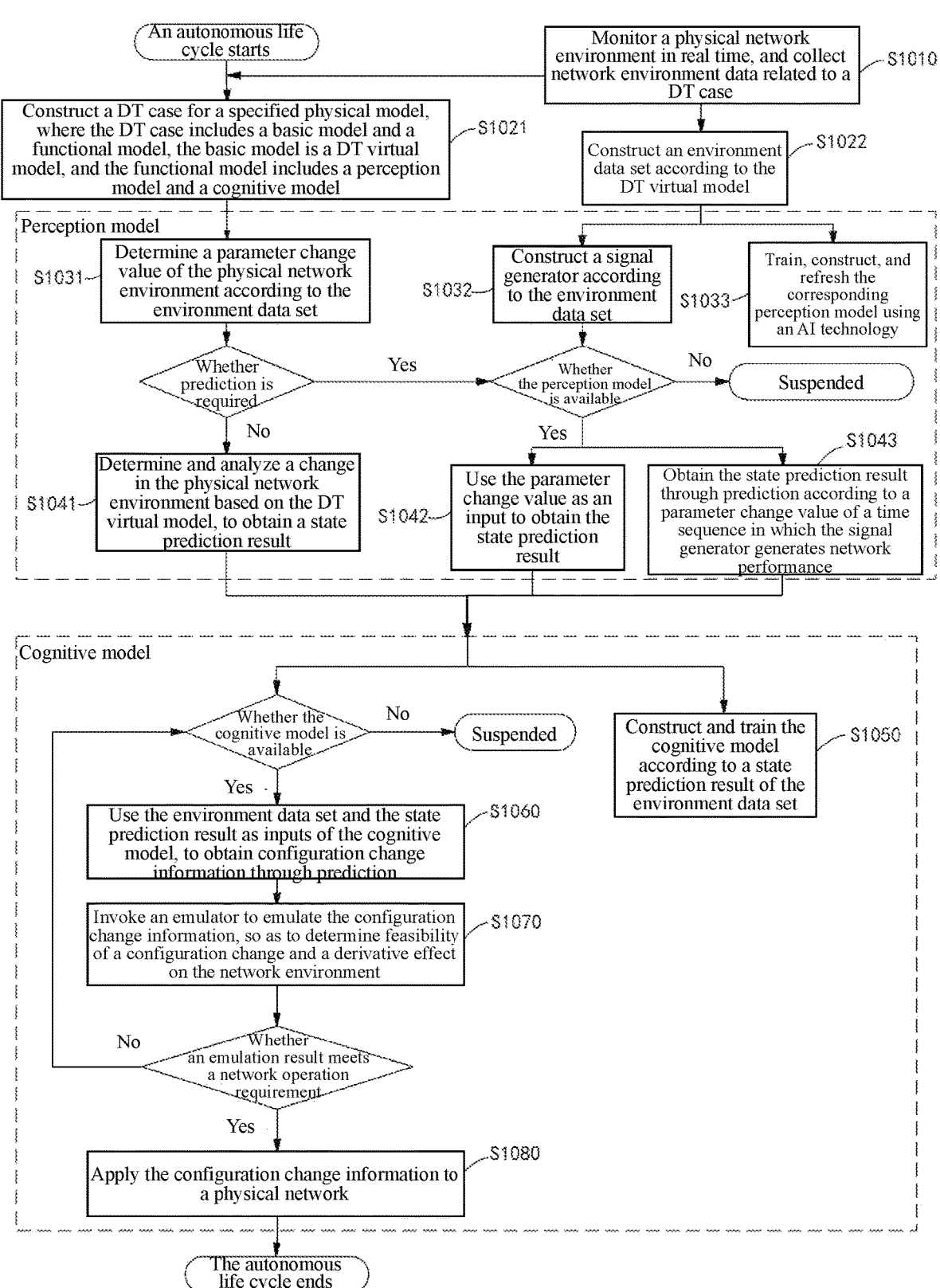
FIG. 10 is an example flowchart of a network management and control method according to another embodiment of the present disclosure.

To better describe a collaborative relationship of the DT case in this embodiment of the present disclosure, a specific example is provided below. As shown in FIG. 10, a network management and control method in this example includes, but not limited to, the following steps S1010 to S1080.

At S1010, a physical network environment is monitored in real time, and network environment data related to the DT case is collected.

At S1021, a DT case is constructed for a specified physical model, where the DT case includes a basic model and a functional model, the basic model is a DT virtual model, and the functional model includes a perception model and a cognitive model. Then, a step S1031 is performed.

At S1022, an environment data set is constructed according to the DT virtual model. Then, a step S1032 or S1033 is performed.

At S1031, a parameter change value of the physical network environment is determined according to the environment data set. If prediction needs to be performed and the perception model is available, a step S1042 or S1043 is performed. If prediction does not need to be performed, a step S1041 is performed.

At S1032, a signal generator is constructed according to the environment data set. If the perception model is available, S1042 is performed.

At S1033, the corresponding perception model is trained, constructed, and refreshed by using an AI technology.

At S1041, a change in the physical network environment is determined and analyzed based on the DT virtual model, to obtain a state prediction result. If the perception model is available, a step S1060 is performed.

At S1042, the parameter change value is used as an input to obtain the state prediction result. If the perception model is available, S1060 is performed.

At S1043, the state prediction result is obtained through prediction according to a parameter change value of a time sequence in which the signal generator generates network performance. If the perception model is available, S1060 is performed.

At S1050, the cognitive model is constructed and trained according to a state prediction result of the environment data set.

At S1060, the environment data set and the state prediction result are used as inputs of the cognitive model, to obtain configuration change information through prediction.

At S1070, an emulator is invoked to emulate the configuration change information, so as to determine feasibility of a configuration change and a derivative effect on the network environment. If an emulation result meets a network operation requirement, S1080 is performed; otherwise, S1060 is performed again.

At S1080, the configuration change information is applied to a physical network.

In addition, in an embodiment, referring to FIG. 11, S520 in the embodiment shown in FIG. 5 further includes, but not limited to, a following step S1110.

At S1110, training from the cognitive model to the perception model is performed using a backward propagation algorithm, where the performance parameter is a training input of the perception model, the state parameter is a training output of the perception model, the state prediction result and the environment data set are training inputs of the cognitive model, and the target state is determined as an output of the cognitive model.

It should be noted that, on the basis that the environment data set is available, the performance parameter is used as an input and the state parameter is used as an output, such that the trained perception model can obtain the corresponding state parameter through prediction according to a change of the performance parameter. For example, Recurrent Neural Network (RNN) is used as an AI algorithm of the perception model. Those having ordinary skills in the art know how to train a deep learning model, and details are not described herein.

It should be noted that, in this embodiment, the perception model and the cognitive model are concatenated, and a backward propagation algorithm is used for model parameters in the cognitive model and the perception model. To be specific, the model parameters may be updated iteratively using a gradient descending/ascending method based on a chain derivation rule until a gradient of parameters of the concatenated models approach 0. In this case, an entire iterative update ends, completing unified training of an end-to-end AI model from the cognitive model to the perception model. The backward propagation algorithm and the chain derivation method are technologies familiar to those having ordinary skills in the art, and details are not described herein. Training by backward propagation can realize integrated concatenation from the cognitive model to the perception model, which is conducive to the realization of automatic detection, optimization, and troubleshooting of the physical network, thereby improving stability of the physical network.

It should be noted that, with the RNN technology, the perception model can use distribution of network service traffic at different moments in an entire time sequence period as RNN inputs, to predict states of a key link of an OTN network at the different moments in the entire time sequence period, which states together with a topology status of a current network are used as an input of the cognitive model. The cognitive model may use a DRL technology of Actor-Critic, to obtain an optimal configuration change scheme for OTN network traffic optimization after training and reasoning. For example, in a structure shown in FIG. 12, a performance parameter is distribution of network service traffic, where t is a quantity of performance parameters. X1 to Xt are input into RNN units for prediction. After X1 is input into an RNN unit 1 for prediction, state prediction results output are states of a key link at different moments in the entire time sequence period, where Z1 is an output corresponding to the input X1. By analogy, after the perception model outputs the state prediction results, Z1 to Zt and an environment data set are used as training inputs of the cognitive model, and a target state is used as a target function of the cognitive model. Therefore, training of the cognitive model is implemented. When an input and an output are available, those having ordinary skills in the art know how to train a deep learning network, and details are not described herein.

To better describe the technical schemes of the present disclosure, a specific example is provided below.

Figure 13:
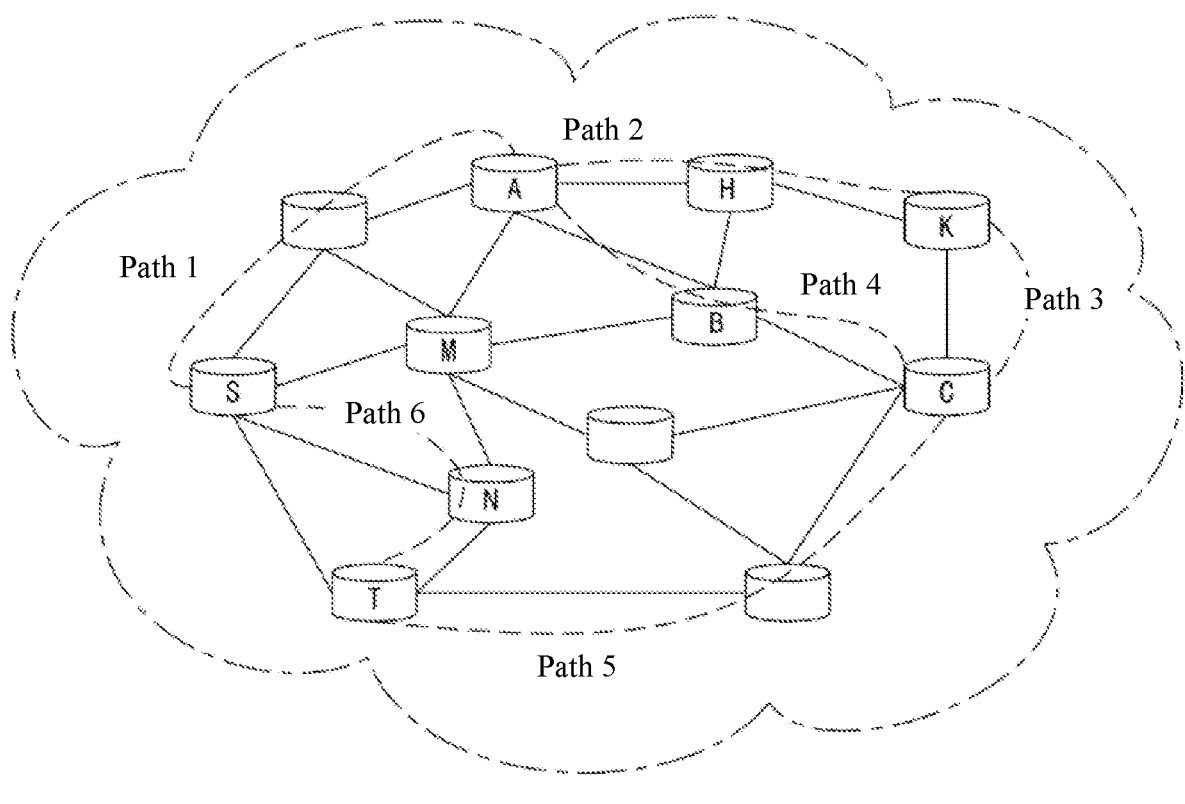
FIG. 13 is a schematic diagram of a topology of Example one according to another embodiment of the present disclosure.

In this example, the physical model is a Mesh networking topology of an OTN shown in FIG. 13. There are six Flexible Optical Channel Data Unit (ODUflex) service paths in the network, which are respectively a path 1: A-S, a path 2: A-K, a path 3: K-C, a path 4: A-B-C, a path 5: T-C, and a path 6: S-N-T. The physical model further includes a key link 1: S-N, and a key link 2: A-B. In this example, 15 minutes is used as the target analysis time sequence.

Referring to FIG. 14, the method in this example further includes, but not limited to, the following steps S1410 to S1450.

At S1410, current traffic distribution of the OTN network is determined as the target object of the DT case, and the corresponding DT virtual model of the DT case is constructed.

At S1420, an OTN network traffic perception algorithm model is constructed based on an OTN network traffic abstracted virtual model of the DT case and an OTN network traffic perception analysis requirement.

It should be noted that, for a structure of the perception model, reference may be made to FIG. 12. By using RNN as an example, an input at each moment t is $$X_t = \begin{bmatrix} X_{1t} \\ X_{2t} \\ X_{3t} \\ X_{4t} \\ X_{5t} \\ X_{6t} \end{bmatrix},$$

which is in a vector form. Each element of the vector is a continuous variable, indicating an average traffic volume value (in Gbit/s) per 15 minutes of each ODUflex service at the moment t.

At S1430, trend states of the key links are predicted using the perception model.

It should be noted that, according to the foregoing input $X_t$, it is obtained through prediction that an output at each corresponding moment t is $$Z_t = \begin{bmatrix} Z_{1t} \\ Z_{2t} \\ Z_{3t} \\ Z_{4t} \\ Z_{5t} \\ Z_{6t} \end{bmatrix},$$

where $Z_t$ is in a vector form. Each element is a discrete variable, representing trend state values of n key links in the OTN network topology at the moment t. The trend states are described using numerical values. For example, 0 indicates a normal traffic state, 1 indicates a flow state, 2 indicates traffic congestion, 3 indicates an ebb state, and 4 indicates light traffic load.

At S1440, an OTN network traffic cognitive algorithm model of the DT case is constructed based on the OTN network traffic abstracted virtual model of the DT case, an inference output of the OTN network traffic perception algorithm model, and an OTN network traffic cognitive analysis requirement.

It should be noted that in this example, a cognitive algorithm model used by the DT case to implement an OTN network traffic cognitive analysis procedure mainly adopts an Actor-Critic algorithm of a DRL technology. Inputs of an Actor-Critic algorithm instance include a current network topology and service distribution of the OTN, and a congestion trend state of each key link at moments 0 to t. Based on the foregoing inputs, a congested link may be further used as a must avoid constraint, and a lightly-loaded link be used as a mandatory constraint.

At S1450, an adjustment policy output by the OTN network traffic cognitive algorithm model of the DT case is obtained, and the physical model is adjusted according to the adjustment policy.

In addition, referring to FIG. 15, an embodiment of the present disclosure provides a network management and control system. The network management and control system 1500 includes a memory 1510, a processor 1520, and a computer program stored in the memory 1510 and executable by the processor 1520.

The processor 1520 and the memory 1510 may be connected by a bus or in other ways.

A non-transient software program and an instruction that are required for implementing the network management and control method in the foregoing embodiments are stored in the memory 1510 which, when executed by the processor 1520, cause the processor 1520 to implement the network management and control method in the foregoing embodiments, for example, implement steps S110 to S140 in FIG. 1, steps S410 to S420 in FIG. 4, step S510 in FIG. 5, steps S610 to S630 in FIG. 6, steps S710 to S720 in FIG. 7, steps S810 to S820 in FIG. 8, steps S910 to S920 in FIG. 9, or step S1110 in FIG. 11.

The apparatus embodiment described above is merely illustrative. Units described as separate parts may be or may not be physically separate. That is, the units may be located in one place, or may be distributed on a plurality of network units. Some or all of the modules may be selected according to an actual requirement to achieve the objectives of the scheme in this embodiment.

In addition, an embodiment of the present disclosure provides a computer readable storage medium, storing a computer executable instruction which, when executed by a processor or a controller, for example, the processor in the foregoing embodiment of the network management and control system, causes the processor to implement the network management and control method in the foregoing embodiments, for example, implement steps S110 to S140 in FIG. 1, steps S410 to S420 in FIG. 4, step S510 in FIG. 5, steps S610 to S630 in FIG. 6, steps S710 to S720 in FIG. 7, steps S810 to S820 in FIG. 8, steps S910 to S920 in FIG. 9, or step S1110 in FIG. 11. Those having ordinary skills in the art may understand that all or some steps in the method disclosed above and the system may be implemented as software, firmware, hardware, and appropriate combinations thereof. Some physical components or all physical components may be implemented as software executed by a processor, such as a Central Processing Unit (CPU), a Digital Signal Processor (DSP), or a microprocessor, or may be implemented as hardware, or may be implemented as an integrated circuit (IC), such as an Application-Specific Integrated Circuit (ASIC). Such software may be distributed on a computer readable medium. The computer readable medium may include a computer storage medium (or a non-temporary medium) and a communications medium (or a temporary medium). As is known to those having ordinary skills in the art, the term "computer storage medium" includes volatile, non-volatile, removable, and non-removable media that are implemented in any method or technology used for storing information (such as computer readable instructions, data structures, program modules, or other data). The computer storage medium includes, but not limited to, a Random-Access Memory (RAM), a Read-Only Memory (ROM), an Electrically Erasable Programmable Read-Only Memory (EEPROM), a flash memory or another memory technology, a Compact Disc Read-Only Memory (CD-ROM), a Digital Versatile Disk (DVD) or another optical disk storage, a magnetic cassette, a magnetic tape, a magnetic disk storage or another magnetic storage apparatus, or any other medium that may be configured to store desired information and may be accessed by a computer. In addition, those having ordinary skills in the art know that a communications medium generally includes a computer readable instruction, a data structure, a program module, or other data in a modulated data signal such as a carrier or another transmission mechanism, and may include any information delivery medium.

An embodiment of the present disclosure provides a network management and control method, including: obtaining a parameter change value of a target object, where the parameter change value is from a DT virtual model, the DT virtual model is constructed based on a physical model, the physical model includes entity objects of a physical network, and the parameter change value represents a change in transmission performance of the target object; inputting the parameter change value into a pre-trained perception model, to obtain a state prediction result output by the perception model; inputting the state prediction result into a pre-trained cognitive model, to obtain configuration adjustment information output by the cognitive model; and when the configuration adjustment information passes emulation verification, adjusting the physical model according to the configuration adjustment information. According to the scheme provided in this embodiment of the present disclosure, a DT virtual model can be used as a data basis, a change of a physical model and a change trend can be perceived and predicted by using a perception model, and a perception result and a prediction result can be used as inputs of a cognitive model, to obtain configuration adjustment information of a physical network. After emulation verification is performed, automatic management and control of the physical network can be implemented. In this embodiment of the present disclosure, automatic control of an optical network can be implemented using a DT technology in combination with a cognitive optical network technology.

The foregoing describes some implementations of the present disclosure in detail. However, the present disclosure is not limited to the foregoing implementations. Those having ordinary skills in the art may make various equivalent variations or replacements without departing from the protection scope of the present disclosure. These equivalent variations or replacements fall within the scope defined by the claims of the present disclosure.

What is claimed is:

1. A network management and control method, comprising:

obtaining a parameter change value of a target object, wherein the parameter change value is from a Digital Twin (DT) virtual model, the DT virtual model is constructed based on a physical model, the physical model comprises entity objects of a physical network, and the parameter change value represents a change in transmission performance of the target object;

inputting the parameter change value into a pre-trained perception model, to obtain a state prediction result output by the perception model;

inputting the state prediction result into a pre-trained cognitive model, to obtain configuration adjustment information output by the cognitive model; and in response to the configuration adjustment information passing emulation verification, adjusting the physical model according to the configuration adjustment information;

wherein before inputting the parameter change value into the pre-trained perception model, the method further comprises:

obtaining an environment data set corresponding to the physical model from the DT virtual model, wherein the environment data set comprises a performance parameter and a state parameter of each of the entity objects in the physical model;

wherein after obtaining the environment data set corresponding to the physical model from the DT virtual model, the method further comprises:

obtaining a preset time sequence;

determining probability distribution of the performance parameter and the state parameter in the time sequence; and constructing a signal generation model according to the probability distribution and the time sequence.

2. The method of claim 1, wherein before obtaining the parameter change value of the target object, the method further comprises:

determining an entity object whose performance parameter changes in the physical model as the target object.

3. The method of claim 1, wherein obtaining the parameter change value of the target object comprises:

determining a target analysis time sequence; and constructing the parameter change value of the target object in the target analysis time sequence according to the signal generation model.

4. The method of claim 1, wherein inputting the state prediction result into the pre-trained cognitive model, to obtain the configuration adjustment information output by the cognitive model comprises:

obtaining a target state and a constraint condition which are preset; and inputting the environment data set, the target state, the state prediction result, and the constraint condition into the cognitive model, to obtain the configuration adjustment information for the target object which is output by the cognitive model.

5. The method of claim 4, wherein after obtaining the environment data set corresponding to the physical model from the DT virtual model, the method comprises:

performing training from the cognitive model to the perception model using a backward propagation algorithm, wherein the performance parameter is a training input of the perception model, the state parameter is a training output of the perception model, the state prediction result and the environment data set are training inputs of the cognitive model, and the target state is determined as an output of the cognitive model.

6. The method of claim 5, wherein performing training from the cognitive model to the perception model using the backward propagation algorithm comprises:

determining, in a sequence from an output end to an input end, a gradient value for an output result of each network layer in the cognitive model and the perception model; and in response to the gradient value meeting a preset training condition, determining that the training from the output end of the cognitive model to the input end of the perception model is completed.

7. The method of claim 1, wherein in response to the configuration adjustment information passing the emulation verification, the method comprises:

performing the emulation verification according to the configuration adjustment information, to obtain an emulation result; and in response to the emulation result representing that a running status of the physical model meets a preset standard, determining that the configuration adjustment information passes the emulation verification.

8. The method of claim 1, wherein before obtaining the parameter change value of the target object, the method further comprises:

obtaining analysis requirement information, and determining a to-be-analyzed object in the analysis requirement information as the target object.

9. A network management and control system, comprising a memory, a processor, and a computer program stored in the memory and executable by the processor which, when executed by the processor, causes the processor to perform a network management and control method, comprising:

obtaining a parameter change value of a target object, wherein the parameter change value is from a Digital Twin (DT) virtual model, the DT virtual model is constructed based on a physical model, the physical model comprises entity objects of a physical network, and the parameter change value represents a change in transmission performance of the target object;

inputting the parameter change value into a pre-trained perception model, to obtain a state prediction result output by the perception model;

inputting the state prediction result into a pre-trained cognitive model, to obtain configuration adjustment information output by the cognitive model; and in response to the configuration adjustment information passing emulation verification, adjusting the physical model according to the configuration adjustment information;

wherein before inputting the parameter change value into the pre-trained perception model, the method further comprises:

obtaining an environment data set corresponding to the physical model from the DT virtual model, wherein the environment data set comprises a performance parameter and a state parameter of each of the entity objects in the physical model;

wherein after obtaining the environment data set corresponding to the physical model from the DT virtual model, the method further comprises:

obtaining a preset time sequence;

determining probability distribution of the performance parameter and the state parameter in the time sequence; and constructing a signal generation model according to the probability distribution and the time sequence.

10. The network management and control system of claim 9, wherein before obtaining the parameter change value of the target object, the method further comprises:

determining an entity object whose performance parameter changes in the physical model as the target object.

11. The network management and control system of claim 9, wherein before obtaining the parameter change value of the target object, the method further comprises:

obtaining analysis requirement information, and determining a to-be-analyzed object in the analysis requirement information as the target object.

12. The network management and control system of claim 10, wherein obtaining the parameter change value of the target object comprises:

determining a target analysis time sequence; and constructing the parameter change value of the target object in the target analysis time sequence according to the signal generation model.

13. The network management and control system of claim 10, wherein inputting the state prediction result into the pre-trained cognitive model, to obtain the configuration adjustment information output by the cognitive model comprises:

obtaining a target state and a constraint condition which are preset; and inputting the environment data set, the target state, the state prediction result, and the constraint condition into the cognitive model, to obtain the configuration adjustment information for the target object which is output by the cognitive model.

14. The network management and control system of claim 13, wherein after obtaining the environment data set corresponding to the physical model from the DT virtual model, the method comprises:

performing training from the cognitive model to the perception model using a backward propagation algorithm, wherein the performance parameter is a training input of the perception model, the state parameter is a training output of the perception model, the state prediction result and the environment data set are training inputs of the cognitive model, and the target state is determined as an output of the cognitive model.

15. The network management and control system of claim 9, wherein in response to the configuration adjustment information passing the emulation verification, the method comprises:

performing the emulation verification according to the configuration adjustment information, to obtain an emulation result; and in response to the emulation result representing that a running status of the physical model meets a preset standard, determining that the configuration adjustment information passes the emulation verification.

16. A non-transitory computer readable storage medium, storing a computer executable instruction which, when executed by a processor, causes the processor to perform a network management and control method, comprising:

obtaining a parameter change value of a target object, wherein the parameter change value is from a Digital Twin (DT) virtual model, the DT virtual model is constructed based on a physical model, the physical model comprises entity objects of a physical network, and the parameter change value represents a change in transmission performance of the target object;

inputting the parameter change value into a pre-trained perception model, to obtain a state prediction result output by the perception model;

inputting the state prediction result into a pre-trained cognitive model, to obtain configuration adjustment information output by the cognitive model; and in response to the configuration adjustment information passing emulation verification, adjusting the physical model according to the configuration adjustment information;

wherein before inputting the parameter change value into the pre-trained perception model, the method further comprises:

obtaining an environment data set corresponding to the physical model from the DT virtual model, wherein the environment data set comprises a performance parameter and a state parameter of each of the entity objects in the physical model;

wherein after obtaining the environment data set corresponding to the physical model from the DT virtual model, the method further comprises:

obtaining a preset time sequence;

determining probability distribution of the performance parameter and the state parameter in the time sequence; and constructing a signal generation model according to the probability distribution and the time sequence.

* * * * *